United States Patent [19]
Mani

[11] Patent Number: 6,029,725
[45] Date of Patent: Feb. 29, 2000

[54] MULTIPLE LINK TIRE BELT

[75] Inventor: Neel K. Mani, Stow, Ohio

[73] Assignee: Bridgestone/Firestone, Inc., Akron, Ohio

[21] Appl. No.: 09/104,590

[22] Filed: Jun. 25, 1998

Related U.S. Application Data

[62] Division of application No. 08/732,826, Oct. 15, 1996, Pat. No. 5,817,197.

[51] Int. Cl.[7] ................................ B60C 9/00; B60C 9/18
[52] U.S. Cl. .......................... 152/197; 152/199; 152/526
[58] Field of Search .................................. 152/192, 194, 152/196, 197, 199, 526

[56] References Cited

U.S. PATENT DOCUMENTS

| | | |
|---|---|---|
| 500,468 | 6/1893 | Boyd . |
| 559,987 | 5/1896 | Van Wagenen . |
| 560,196 | 5/1896 | Dean . |
| 939,611 | 11/1909 | Midgley . |
| 943,371 | 12/1909 | Angelicola ............................ 152/199 |
| 1,327,503 | 1/1920 | Varner .................................. 152/199 |
| 1,481,488 | 1/1924 | Tobin . |
| 1,482,217 | 1/1924 | Broluska . |
| 1,904,502 | 4/1933 | Michelin ............................ 152/199 X |
| 2,160,219 | 5/1939 | Kramis . |
| 3,640,329 | 2/1972 | Chien . |
| 4,456,048 | 6/1984 | Markow et al. . |
| 5,417,266 | 5/1995 | Janus . |
| 5,597,426 | 1/1997 | Ludwig .............................. 152/197 X |

FOREIGN PATENT DOCUMENTS

| | | |
|---|---|---|
| 26519 | 5/1930 | Australia ............................. 152/199 |
| 0 115 129 | 8/1984 | European Pat. Off. . |
| 1491492 | 7/1967 | France . |
| 2208905 | 9/1973 | Germany ............................ 152/526 |
| 3738078 | 5/1989 | Germany ............................ 152/526 |
| 42 14 842 | 11/1993 | Germany . |

*Primary Examiner*—Adrienne C. Johnstone
*Attorney, Agent, or Firm*—John M. Vasuta; Michael Sand

[57] ABSTRACT

The present invention is an improved tire design including a continuous annular band or a belt formed of a plurality of relatively flat rigid plates embedded in the rubber between the tread and body plies. The plates are curved to conform to the radius of the tire and are pivotally linked or otherwise pivotally connected together thereby creating a flexible annular belt that is extremely stiff in the in-plane or steering torsional direction due to the engagement of the side edges of the adjacent plates when experiencing an in-plane or steering torsional force but flexible in the radial direction due to the pivotal connection between the adjacent plates.

4 Claims, 7 Drawing Sheets

MULTIPLE LINK TIRE BELT

CROSS REFERENCE TO RELATED APPLICATION

This application is a Divisional Application of currently U.S. patent application Ser. No. 08/732,826, filed on Oct. 15, 1996, now U.S. Pat. No. 5,817,197 the disclosures of which are incorporated herein by reference.

BACKGROUND OF THE INVENTION

1. Technical Field

The present invention is generally directed to tires including passenger tires, light truck tires, truck and bus tires, racing tires, and temporary spare tires, and more particularly to an improved tire of multiple plate construction. Specifically, the present invention is an improved tire manufactured using a multiple link tire belt design made of flat plate or plates curved to conform to the radius of the desired tire where the plates are linked or otherwise connected together thereby creating a flexible ring that is extremely stiff in the in-plane torsional direction but flexible in the radial direction.

2. Background Information

With the advent and rapid expansion of automobiles and other vehicles in the late nineteenth and all of the twentieth century, the use and importance of tires as the means of contact between the automobile and the road has grown. This is particularly true as the speeds at which vehicles are operated has risen and continues to rise. In addition, today's varying road designs and conditions make the tire and its construction, expected life span, and properties of critical importance.

Numerous tire designs both patented and not patented are well known in the art and have been for almost one hundred years. Generally, tires include various chemicals compounded into the natural or synthetic rubber resulting in a continuous rubber compound that encircles a rim of a wheel where the rubber compound is able to withstand heightened wear and heat as well as aging. Fabric such as rayon, nylon, or polyester are also often used to give the tire body added strength and resilience. This fabric when layered under the tread rubber will also increase mileage and improve handling. A steel wire is used in the bead area to hold the tire to the rim.

Generally, the rubber compound making up the tire has two parts, namely the tread section and the body section. The tread section is the outer face which contacts with the road and therefor should preferably provide the highest levels of traction possible while also resisting wear and abrasion from the road contact. The body section fills out the remainder of the tire and is required to provide the necessary tire strength and flexibility.

Three overall types of tires are principally known, namely the bias type tire, the belted bias type tire, and the radial tire. All three types use successive plies consisting of cords of steel wires applied along a specific configuration.

Specifically, bias tires have typically two or more plies of cords. These plies of cord extend diagonally across the tire from bead to bead. The cords run diagonally in opposite directions in each successive ply. A treaded rubber outer covering envelopes the plies.

Belted bias tires use the same ply technology as biased tires except belts of material are inserted in between the layers. Specifically, the belts of material are circumferentially aligned around the tire in between the plies and the treaded rubber outer covering.

Radial tires differ significantly from the bias tires because the cords do not extend diagonally and instead extend transversely from bead to bead. This transverse extension of the cords in each ply is such that the cords are substantially perpendicular to the direction of travel. Belts of material are then placed circumferentially around the tire.

Overall, the today's tire designs typically involve tires made of two ply belts where each belt is made of steel wires. It is well known that an additional ply may be added to provide better cornering. One alternative design also known in the art involves using circumferentially continuous banded belts to define the tire.

Other tire designs include plates added into the rubber compound to protect the tire against puncture. It has also been found that these plates minimize friction between different plies and thus reduce heat in the tire.

Some examples of prior art tires containing internal reinforcements extending in an annular fashion circumferentially around the tire beneath the tread area are shown in U.S. Pat. Nos. 500,468; 559,987; 560,196; 939,611; 1,481,488; 1,482,217; 2,160,219; 3,640,329 and 4,456,048.

However, all of these known designs lack the combination of sufficient stiffness in the in-plane torsional direction as needed for enhanced cornering coupled with sufficient softness for radial and out of plane bending deformations as needed for a good ride.

SUMMARY OF THE INVENTION

Accordingly, it is an object of the present invention to provide a tire that provides enhanced cornering properties.

It is a related object of the present invention provide a tire having at least one belt that is extremely stiff in the in-plane or steering torsional direction but quite flexible in the radial direction.

It is a further object of the invention to provide a tire that provides a good ride since it is soft when experiencing radial and out of plane deformations.

It is a related object of the present invention to provide a tire having at least one belt formed of a plurality of rigid links hingedly connected together for flexibility in the radial direction but in which the adjacent edges come into contact and create a nearly rigid structure when experiencing the in-plane forces.

Still other advantages and benefits of the invention will become apparent to those skilled in the art upon a reading and understanding of the following summary and detailed description.

These objective and advantages are obtained by the pneumatic tire of the present invention the general nature which may be stated as including a tire that is extremely stiff in the in-plane torsional direction and flexible in the radial direction wherein said tire comprises an annular carcass having at least one ply, the ply comprising a plurality of elongated strands, a flexible annular belt comprised of a plurality of rigid plates, each plate separated from and pivotally connected to an adjacent plate by a pivot means, and a rubber compound enveloping the carcass and flexible belt.

BRIEF DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

Similar numerals refer to similar parts and elements throughout the drawings.

DESCRIPTION OF THE PREFERRED EMBODIMENT

Figure 1:
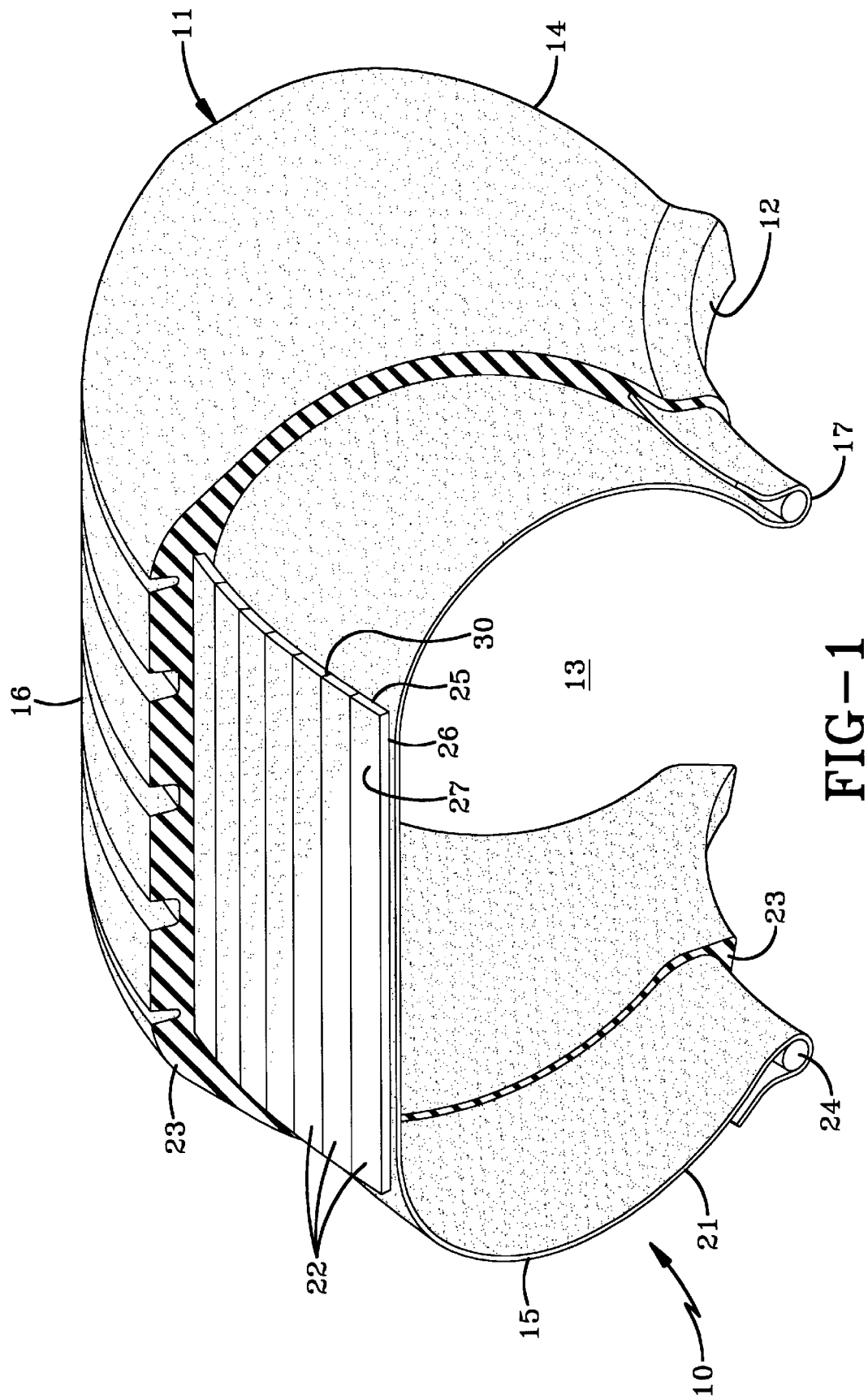
FIG. 1 is a perspective view with portions broken away and in section showing the tire link belt of the present invention.

The present invention is shown generally in FIG. 1 and is an improved tire 10 where the overall tire is preferably of the pneumatic version and configured in the standard toroidal shape with an opening in the middle for receiving a wheel rim. The improved tire 10 as shown in cross section in FIG. 1, involves a tire construction that is extremely stiff in the in-plane torsional direction but flexible in the radial direction.

Specifically, tire 10 includes a wall 11 configured in a C-shaped manner and extending circumferentially around an imaginary central axis thereby defining the center rim opening 12 and an air holding cavity 13 of the standard toroidal shape. Specifically, wall 11 has two sidewall regions 14 and 15 separated by a tread region 16 including land areas and grooves therebetween in any of the many tread patterns well known in the art. The sidewall regions 14 and 15 each extend from a bead area 17 to the tread region 16. The sidewalls are generally curved, while the tread region is generally planar or only slightly curved.

The construction of C-shaped wall 11 of tire 10 is constructed of at least one carcass ply 21, and in accordance with the invention a single belt structure consisting of at least one continuous annular belt indicated generally at 20. Belt 20 is formed by a plurality of hingedly linked rigid plates 22 encapsulated in a rubber compound 23. The wall 11 also includes a steel wire bundle 24 in the bead area 17 to hold tire 10 to a rim when properly mounted thereon. The carcass ply wraps around bead wire 24.

The carcass ply 21 is of a standard construction encompassing one or more plies, each of which includes a plurality of elongated strands of steel or other internal reinforcing metal or synthetic cords. The plies are configured in relation to each other as is well known in the art such as in a bias or radial manner. Fabric or other material may similarly be positioned in between the ply layers as is well known in the art.

Each plate 22 of link belt 20 is a narrow and relatively planar piece of steel or other metal, or alternatively any other similarly stiff and extremely hard material. The relatively planar plates are designed and placed to rigidly follow the contour of the outer radius of the tire and therefor are either flat or slightly curved depending upon the contour of the outer radius of the tire design.

Alternatively, the plates 22 may be manufactured out of a light composite material having sufficient stiffness to meet the in-plane torsional demands of the present invention. The plates may also be constructed in a honeycomb manner rather than in a flat, solid nature. In the honeycomb embodiment, the tread rubber 23 fills the cells during the molding process which further enhances stiffness while keeping weight down.

Figure 2:
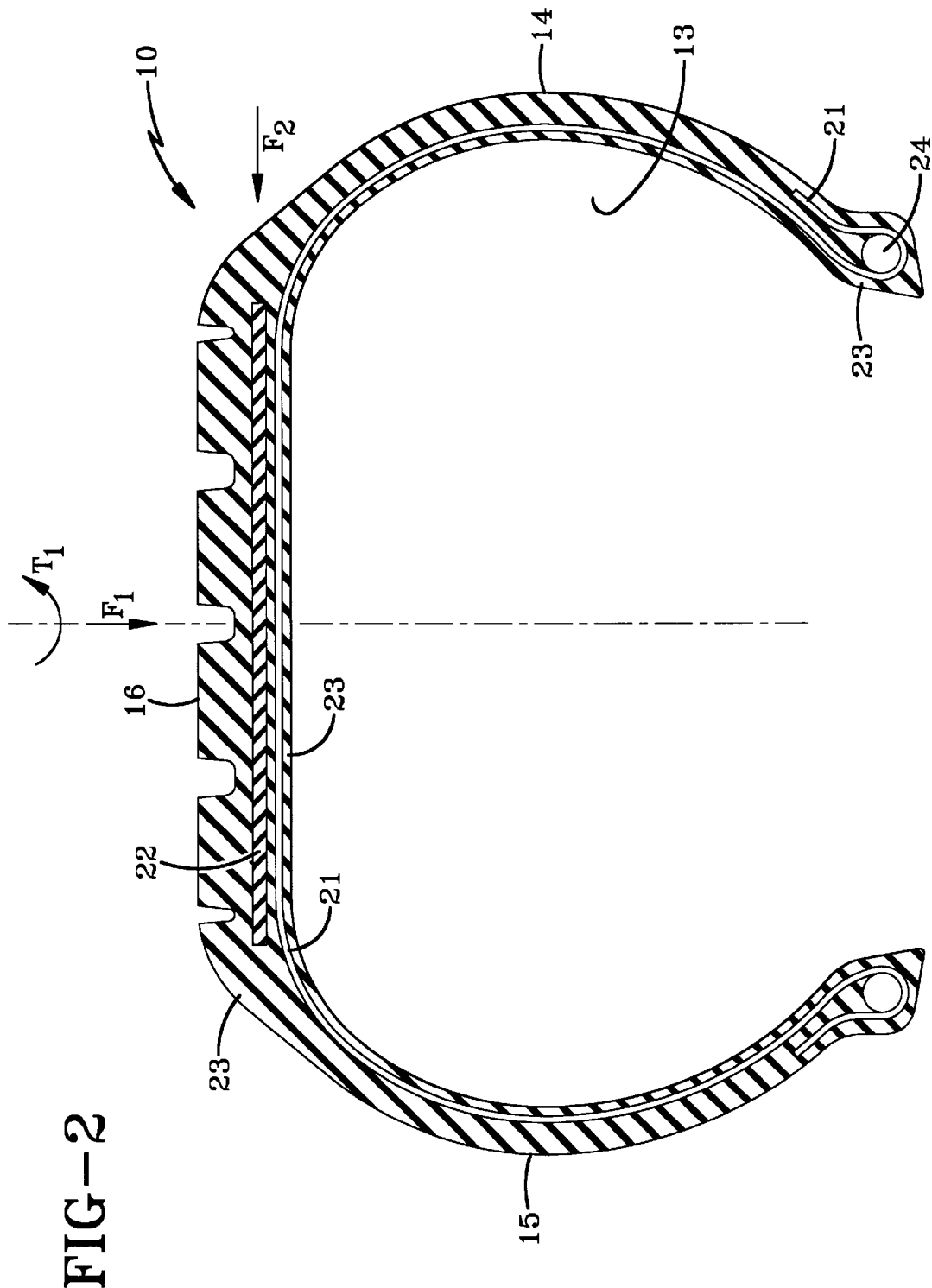
FIG. 2 is a cross sectional view of the tire shown in FIG. 1.

The plates 22 each have a pair of opposed end edges 25, a pair of opposed side edges 26, and a pair of opposed faces 27. The faces are sandwiched in rubber compound between the tread region 16 and carcass ply 21 as is shown in FIG. 2. The side edges of adjacent plates are abutted and hinged together as described below around the entire outer radius of the belt as is shown in FIG. 1.

Specifically, each of the plates 22 is connected to the plates adjacent thereto along the side edges of the respective plates by hinges 30. The hinges 30 may take various forms as described below, including rubber molded between the plates or mechanical links. The plates 22 when interconnected form a stiff annular ring supported by the sidewalls 14 and 15.

After the belt has been assembled in layers if multiple plies are used, and after the plates have been positioned long the outer radius of the belt and fastened together using hinges 30, the rubber compound 23 envelopes or encapsulates the entire belt, the wires, and all of the plates within a mold and is vulcanized resulting in a finished tire, as is shown in cross section in FIG. 2, with some tread configuration including land areas and grooves as needed to meet various environmental and performance criteria.

The hinge 30 connects adjacent plates in a manner so as to allow bending at the hinge connection such that the plates curve around the outer radius of the belt where the tread region will be defined after the rubber compound is molded. These plates 22 are thus a flexible ring of rigid plates connected by flexible hinges 30. The tire is flexible when faced with a radial force F1 (FIG. 2) because each plate 22 is moveable radially inward and outward in relation to the adjacent plates due to the flexibility of the hinge 30. However, the plates 22 are rigidly connected and relatively immovable when faced with a torsional force T1, particularly an in-plane or steering torsional force, because the plates will not displace or move planarly in relation to the adjacent plates.

In operation, when the in-plane or steering torsional displacing force T1 is applied, the side edges of the plates as flexibly connected by the hinge 30, come into solid contact with each other and create a nearly rigid structure while the belt remains flexible in the radial direction. By maintaining flexibility in the radial direction even during torsional loading, the tire demonstrates good cornering properties while maintaining a soft ride. The term "steering torsion" means rotation about the axis in the equatorial plane of the tire, wherein the "equatorial plane" is the plane perpendicular to the axis of rotation through the center of the tire.

Figure 3:
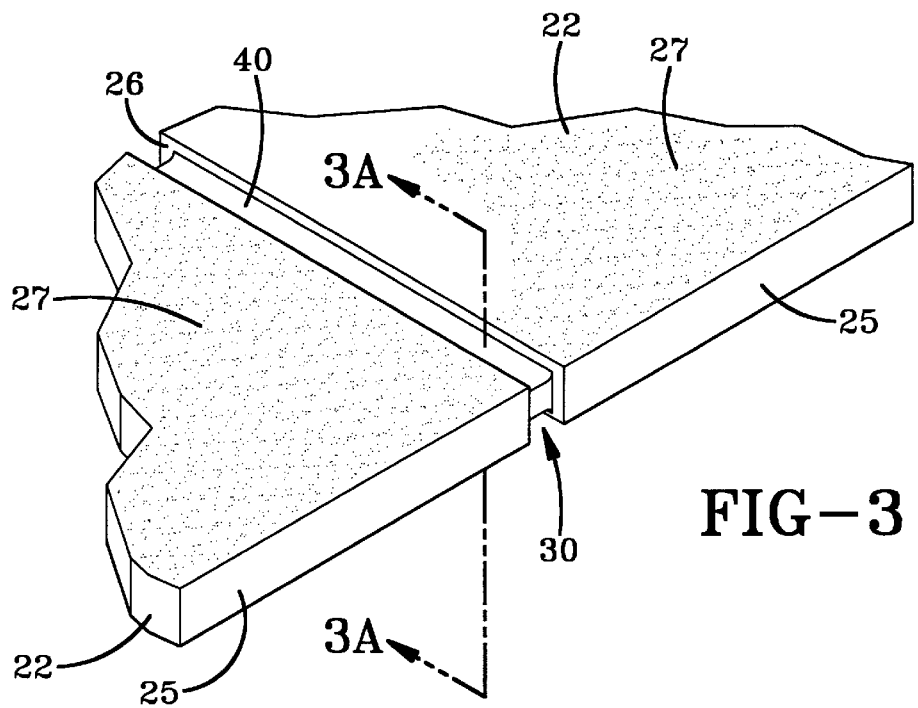
FIG. 3 is an enlarged fragmentary perspective view of a first embodiment of the link belt of the present invention.
Figure 3A:
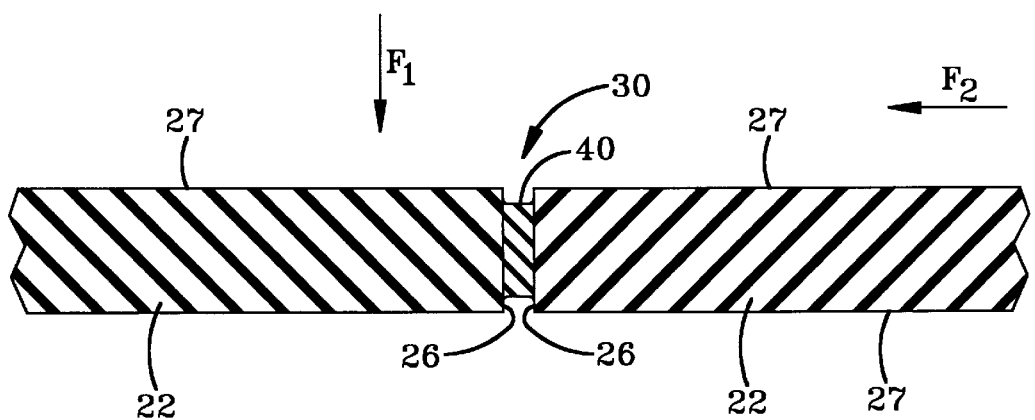
FIG. 3A is a further enlarged fragmentary sectional view taken along line 3A—3A in FIG. 3.

Five different hinge embodiments are shown in FIGS. 3–7A. The first hinge embodiment is shown in FIGS. 3 and 3A and has a flexible connection such as a bead of flexible compound, particularly rubber bead 40 placed between adjacent plates 22. The rubber bead, depending upon the type of rubber used, either adheres to the substantially abutting adjacent plates thereby connecting the plates together, or is in a gap separating adjacent plates and adheres to the adjacent plates thereby connecting the plates together, or merely supplies flexible rubber in a gap between the plates as part of the rubber compound 23 that envelopes the plates 22 and carcass 21. In either case, the rubber hinge 40 positioned in between the plates defines a flexible connection in between adjacent plates and supplies, in conjunction with the rigid plates, flexibility in the radial direction even during torsional loading, while maintaining sufficient stiffness in torsional loading. The result is a tire that demonstrates good cornering properties while providing a soft ride.

Figure 4:
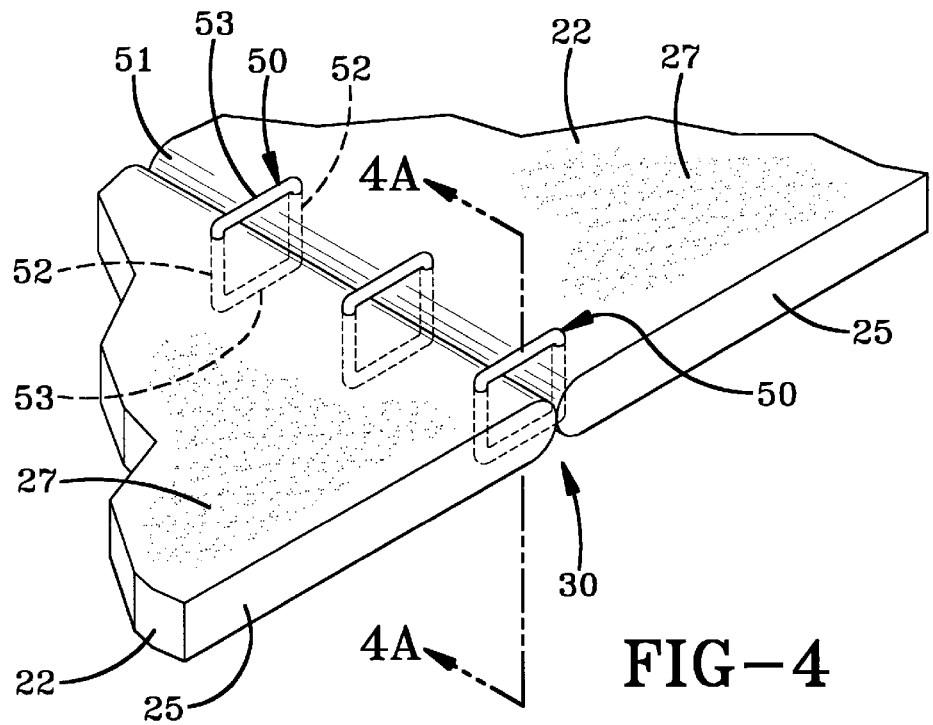
FIG. 4 is an enlarged fragmentary perspective view of a second embodiment of the link belt of the present invention.
Figure 4A:
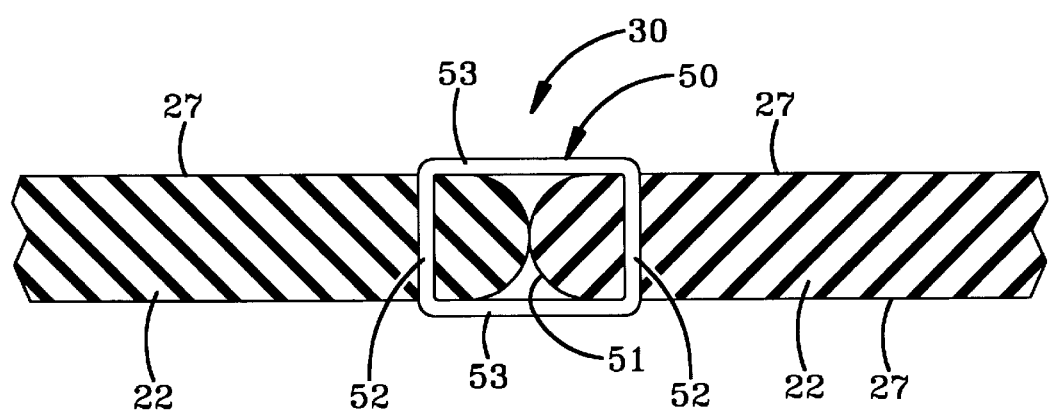
FIG. 4A is a further enlarged fragmentary sectional view taken along line 4A—4A in FIG. 4.

The second hinge embodiment is shown in FIGS. 4 and 4A and includes one or more mechanical links 50 connecting adjacent plates. Preferably, the plates 22 have rounded side edges as is shown in FIGS. 4 and 4A. The links 50 hold the plates together while allowing the plates to pivot in relation to each other along the abutting rounded edges 51. Specifically, the links are typically made of a flexible or elastic type material that allows pivoting while permitting the plates to rebound back. The links 50 function to tie or otherwise pivotably attach the plates together. The link is any mechanical structure capable of pivotably attaching the adjacent plates such as a clip, tie, staple, strap, fastener, looped wire, or any other connector.

In the embodiment shown in FIGS. 4 and 4A, the link is a number of flexible square shaped clips or links 50. Each clip 50 has two plate engaging legs 52 and two connecting legs 53. The plate engaging legs 52 are threaded or otherwise extend through holes formed in the plates in a secure yet flexible manner. The connecting legs 53 extend between the plate engaging legs 52 to provide the necessary coupling of the plates. The link is made of a material of sufficient flexibility so as to allow bending and flexing of the legs 53 as needed in order to supply, in conjunction with the rigid plates, flexibility in the radial direction even during torsional loading while maintaining sufficient stiffness in torsional loading.

Figure 5:
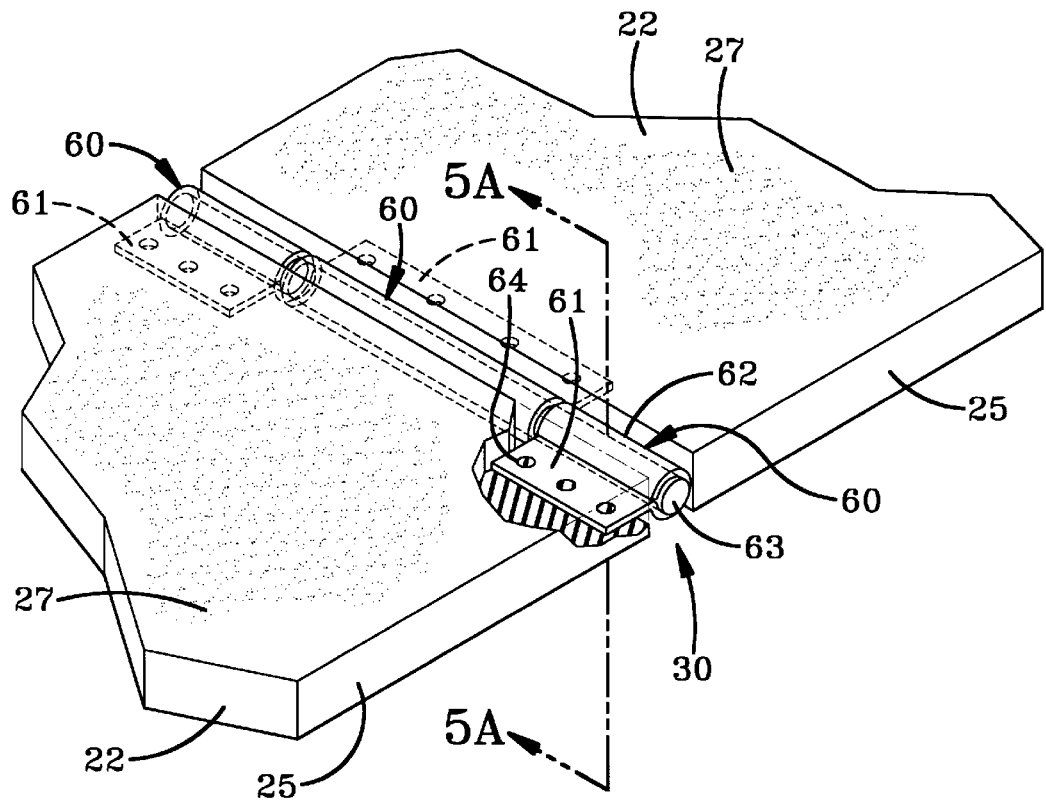
FIG. 5 is an enlarged fragmentary perspective view of a third embodiment of the link belt of the present invention.
Figure 5A:
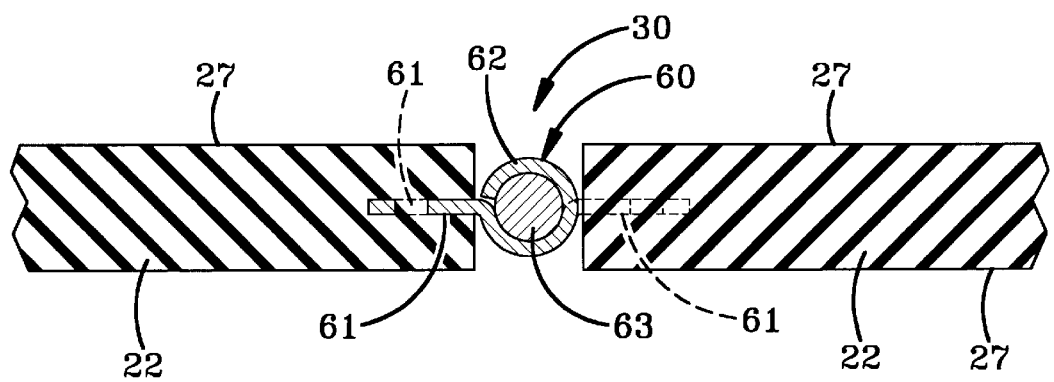
FIG. 5A is a further enlarged sectional view taken along line 5A—5A in FIG. 5.

The third hinge embodiment is shown in FIGS. 5 and 5A as a mechanical swinging hinge 60. Hinge 60 includes connector plates or flanges 61 integrally connected to rotatable tube 62. At least one connector plate 61 is associated with each of the adjacent plates at each hinge connection. An elongated pivot bar or cylinder 63 is inserted axially into the aligned rotatable tubes 62 of each of the hinges 60. The flat flange 61 extends outward from the tube 62 and is securely affixed within or on the plate 22 as is shown in FIGS. 5 and 5A. This securing may occur by welding, fastening (such as by rivet or screw), or the hinge may have been bonded or molded within the plate at the formation of the plate. The embodiment shown in FIGS. 5 and 5A, has the hinges 60 inserted within slots cut in the sides 26 of the plates whereby the steel or other material from which the plate was made has integrally flowed into holes 64 thereby securing the hinge within the plate.

Figure 6:
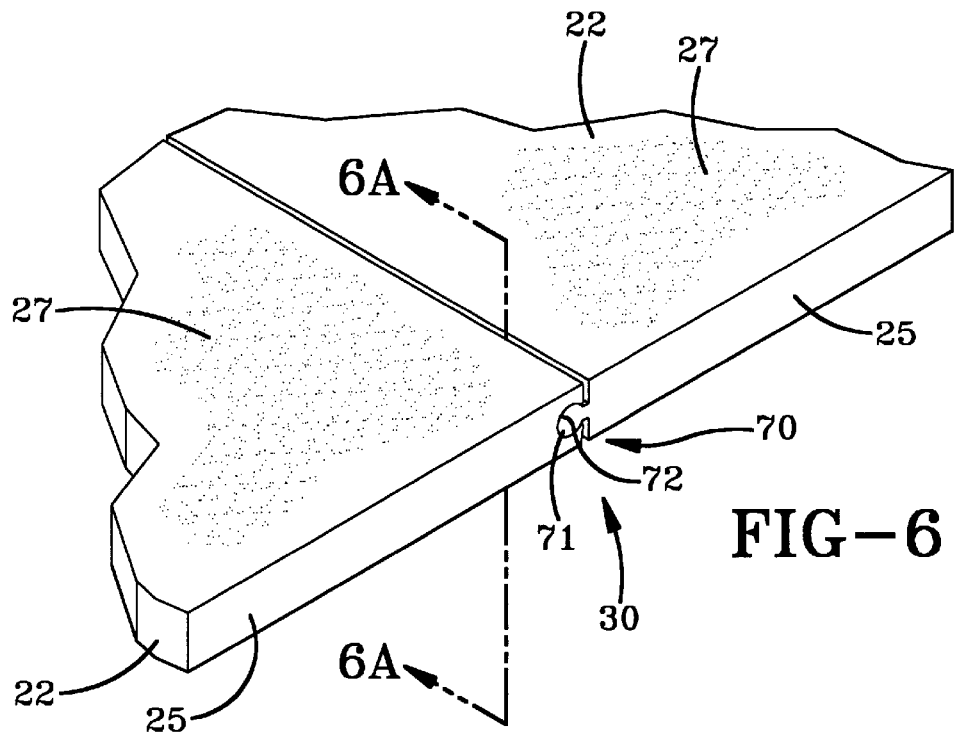
FIG. 6 is an enlarged fragmentary perspective view of a fourth embodiment of the link belt of the present invention.
Figure 6A:
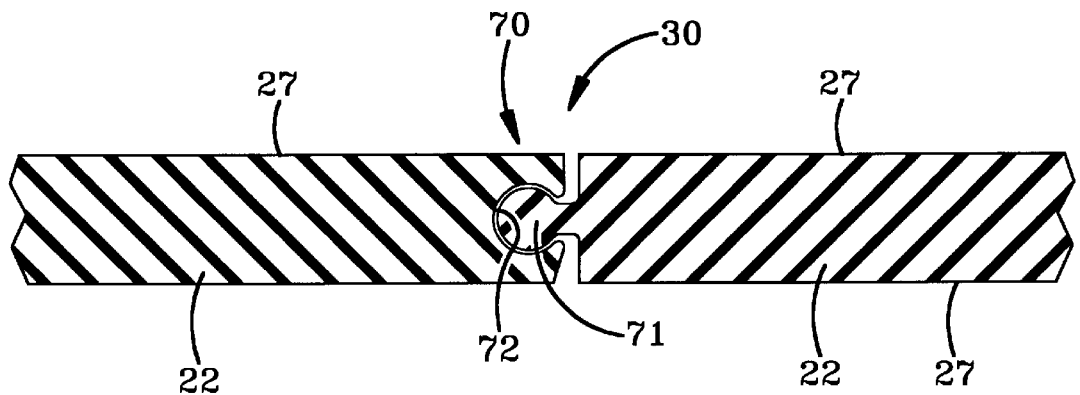
FIG. 6A is a further enlarged sectional view taken on line 6A—6A of FIG. 6.

The fourth hinge embodiment is shown in FIGS. 6 and 6A and is a tongue and groove hinge 70. Hinge 70 includes a tongue 71 extending outward from the side edge of one of the plates 22 and a groove 72 cut within the side edge of the adjacent plate 22. The tongue 71 is swivelably seated within the groove 72. The tongue 71 is generally longer than the groove 72 is deep thereby allowing for some pivoting of the adjacent plates based upon the tongue moving within the groove. The shape of the tongue and groove may vary. However, the shapes includes an elongated cylindrical tongue transversely connected to the side edge and capable of a snap-fit or sliding engagement into an elongated cylindrical slot groove as shown in FIGS. 6 and 6A, as well as one or more ball and socket arrangements where one or more round tongues are insertable into one or more corresponding round holes, or an elongated locking ridge slidably inserted within an elongated groove.

Figure 7:
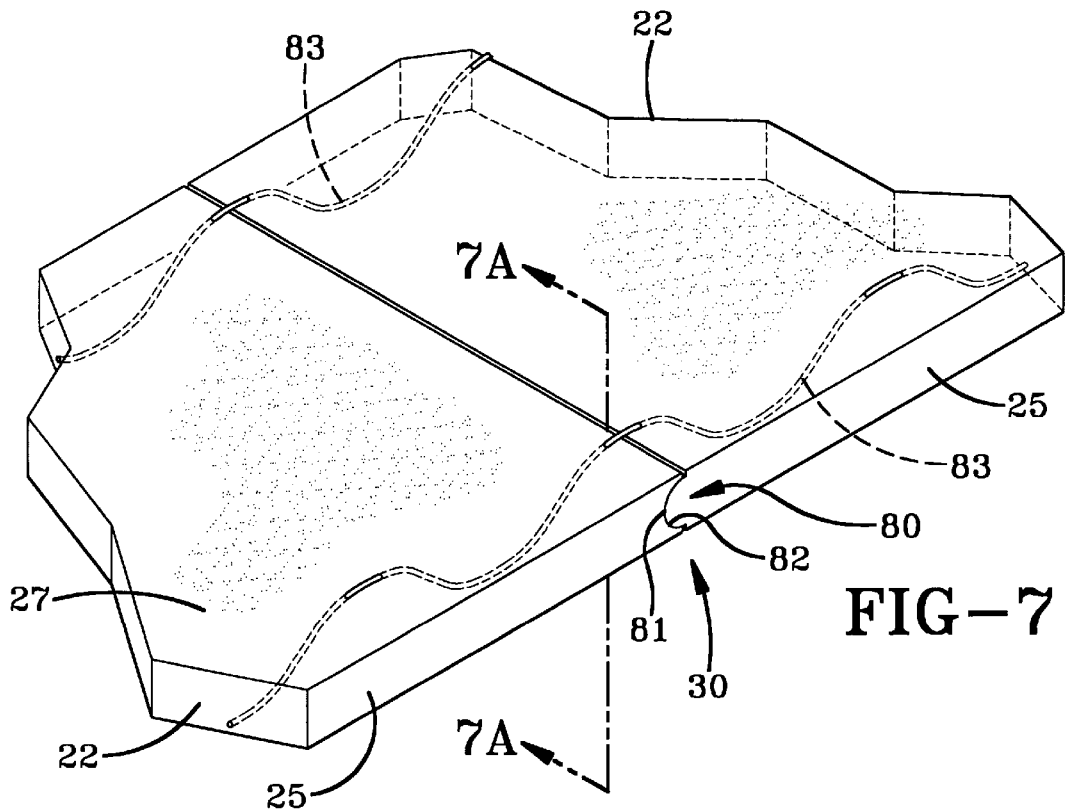
FIG. 7 is an enlarged fragmentary perspective view of a fifth embodiment of the link belt of the present invention; and, FIG. 7A is a further enlarged sectional view taken on line 7A—7A of FIG. 7.
Figure 7A:
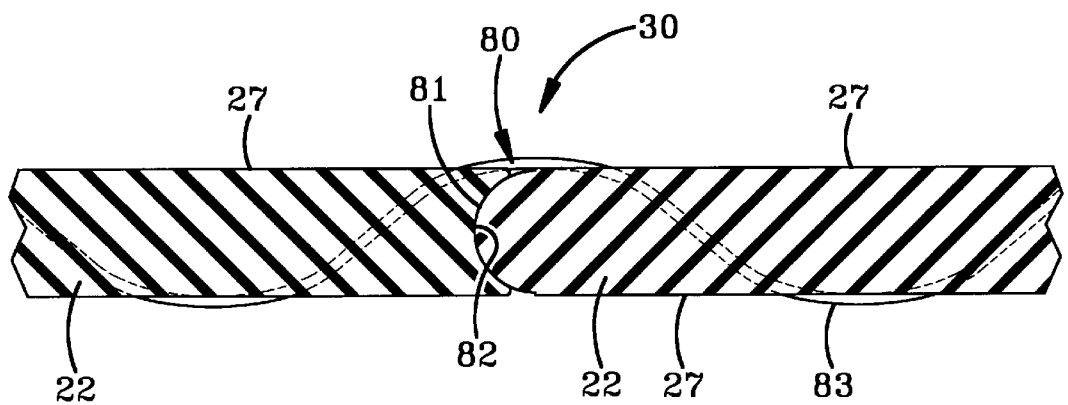

The fifth hinge embodiment is shown in FIGS. 7 and 7A as a convex-concave hinge 80 wired or otherwise held together. The hinge 80 includes a convex face 81 cut in the side edge of one plate 22 and a concave face 82 cut in the side edge of an adjacent plate 22. The convex face 81 pivotably seats within the concave face 82 thereby allowing radial motion. One or more wires 83 are threaded through or integrally formed in plates 22 in a wave-like manner as shown in FIGS. 7 and 7A to supply sufficient tautness to the concave-convex sockets to hold them together while still allowing the needed pivotal movement during the application of radial forces to the tire.

In any of these or other embodiments, the plates 22 may have rounded side edges as is shown in FIGS. 4 and 4A to allow for more easy deformation in a radial inward manner when a radial force is applied to the tire. This will enable the tire to absorb larger bumps better, as well as diminishing the force transmitted to the spindle in comparison to conventional tires.

The width of plates 22 is not critical. The plates of a given tire may all be of the exact same width dimension from side edge to side edge. Alternatively, the widths may vary from plate to plate which functions to minimize or treat noise by minimizing cyclical noise.

This new tire design also provides a unique tire foot print. The foot print will be substantially flat and rectangular due to the rigidity of the plates 22.

In high speed and high temperature conditions, conventional radial tires tend to bulge in the middle of the tread. The plates due to its extreme stiffness act to minimize or eliminate this bulging problem.

Another problem often present in standard radial tires is ply-steer. The symmetrical design of the belt in the present invention acts to minimize or eliminate this ply-steer.

The present invention is applicable to all radial tires that have belts designed therein, and is especially applicable to passenger tires, race tires, light truck tires, truck and bus tires, and temporary spare tires.

Accordingly, the improved multiple link tire belt is simplified, provides an effective, safe, inexpensive, and efficient tire which achieves all the enumerated objectives, provides for eliminating difficulties encountered with prior tires, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the improved pneumatic tire containing a multiple link tire belt is constructed and used, the characteristic of the construction, and the advantageous, new and useful results obtained; the new and useful structures, devices, elements, arrangements, parts, and combinations are set forth in the appended claims.

I claim:

1. A pneumatic tire that is extremely stiff in the in-plane torsional direction but flexible in the radial direction, said tire comprising:

an annular carcass having at least one ply, the ply comprising a plurality of elongated strands;

a single belt structure consisting of at least one flexible annular belt each comprised of a plurality of rigid plates, each plate separated from and pivotally connected to an adjacent plate by a pivot means comprising a tongue extending from one plate swivelably seated within a corresponding groove formed within an adjacent plate; and a rubber compound enveloping the carcass and at least one flexible belt.

2. The pneumatic tire of claim 1 wherein the tongue is an elongated cylinder transversely connected to the one plate and the groove is an elongated cylindrical slot cut in the adjacent plate.

3. The pneumatic tire of claim 1 wherein the tongue is a ball and the groove is a socket.

4. A pneumatic tire that is extremely stiff in the in-plane torsional direction but flexible in the radial direction, said tire comprising:

an annular carcass having at least one ply, the ply comprising a plurality of elongated strands;

a flexible annular belt comprised of a plurality of rigid plates, each plate separated from and pivotally connected to an adjacent plate by a pivot means comprising a tongue extending from one plate swivelably seated within a corresponding groove formed within an adjacent plate, wherein said tongue is a ball and the groove is a socket; and a rubber compound enveloping the carcass and flexible belt.

* * * * *